United States Patent
Jetcheva et al.

(10) Patent No.: US 10,984,003 B2
(45) Date of Patent: Apr. 20, 2021

(54) REPORT GENERATION FOR A DIGITAL TASK

(71) Applicant: FUJITSU LIMITED, Kawasaki (JP)

(72) Inventors: Jorjeta G. Jetcheva, San Jose, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 691 days.

(21) Appl. No.: 15/706,708

(22) Filed: Sep. 16, 2017

(65) Prior Publication Data
US 2019/0087462 A1    Mar. 21, 2019

(51) Int. Cl.
*G06F 16/2457* (2019.01)
*G06F 3/048* (2013.01)
*G06F 16/242* (2019.01)
*G06F 16/9035* (2019.01)

(52) U.S. Cl.
CPC .......... *G06F 16/2457* (2019.01); *G06F 3/048* (2013.01); *G06F 16/2423* (2019.01); *G06F 16/9035* (2019.01)

(58) Field of Classification Search
CPC ............. G06F 16/2457; G06F 16/2423; G06F 16/9035; G06F 3/048
See application file for complete search history.

(56) References Cited

U.S. PATENT DOCUMENTS

| | | | | |
|---|---|---|---|---|
| 7,254,569 B2 * | 8/2007 | Goodman | ............. | G06F 40/174 |
| 7,343,551 B1 * | 3/2008 | Bourdev | ............... | G06F 40/174 715/224 |
| 8,650,284 B2 * | 2/2014 | Sullivan | ............... | G06F 11/3476 709/224 |
| 9,069,580 B2 * | 6/2015 | Armstrong | .......... | G06F 3/04842 |
| 9,560,091 B2 * | 1/2017 | Kass | ..................... | H04L 65/403 |
| 9,870,389 B2 * | 1/2018 | Elliot | .................. | G06F 3/04817 |
| 10,276,170 B2 * | 4/2019 | Gruber | .................... | G10L 17/22 |
| 10,294,770 B2 * | 5/2019 | Anghelescu | ........ | E21B 41/0092 |
| 10,395,652 B2 * | 8/2019 | Chen | .................. | G10L 15/1822 |
| 10,467,230 B2 * | 11/2019 | Alphin, III | .......... | G06F 16/2457 |
| 10,489,377 B2 * | 11/2019 | Abraham | ................ | H04L 67/02 |
| 2010/0223212 A1 * | 9/2010 | Manolescu | .............. | G09B 7/00 706/12 |

(Continued)

OTHER PUBLICATIONS

Primer, A. Introduction to Robotic Process Automation. (2015).

*Primary Examiner* — Robert W Beausoliel, Jr.
*Assistant Examiner* — Susan F Rayyan
(74) *Attorney, Agent, or Firm* — Maschoff Brennan

(57) ABSTRACT

A method of generating a report for a digital task is provided. The method may include receiving an identification of a digital task initiated by a user, and electronically monitoring at least one of user interaction with at least one application while the user performs the digital task via an electronic system and a state of the electronic system while the user performs the digital task via the electronic system. Further, the method may include capturing a plurality of snapshots for the digital task. Each snapshot of the plurality of snapshots may include information for at least of one or more user actions and the state of the electronic system while the user performs the digital task. The method may also include generating a report for the digital task including the plurality of snapshots.

16 Claims, 8 Drawing Sheets

(56) References Cited

U.S. PATENT DOCUMENTS

| | | | |
|---|---|---|---|
| 2012/0210251 A1* | 8/2012 | Abrams | G06Q 10/06 |
| | | | 715/753 |
| 2013/0196253 A1* | 8/2013 | De Rose | H01M 8/0271 |
| | | | 429/510 |
| 2014/0215495 A1* | 7/2014 | Erich | G06F 11/3438 |
| | | | 719/318 |
| 2014/0258882 A1* | 9/2014 | Latzina | G06Q 10/103 |
| | | | 715/751 |
| 2014/0344683 A1* | 11/2014 | Urunga | G06F 9/453 |
| | | | 715/705 |
| 2015/0154529 A1* | 6/2015 | Raajaratnam | G06Q 10/063114 |
| | | | 705/7.15 |
| 2016/0078773 A1* | 3/2016 | Carter | G09B 7/02 |
| | | | 434/353 |
| 2017/0004396 A1* | 1/2017 | Ghotbi | G06N 3/006 |
| 2017/0104841 A1* | 4/2017 | Duke | G06Q 30/0629 |
| 2017/0140307 A1* | 5/2017 | Gottemukkala | G06Q 10/067 |
| 2017/0193349 A1* | 7/2017 | Jothilingam | G06N 3/006 |
| 2017/0286502 A1* | 10/2017 | Bar-Or | G06F 16/2423 |

\* cited by examiner

FIG. 5 depicts an example flow diagram of a method of generating a report for a digital task; and FIGS. 6A-6C are example screenshots generating during performance of an example digital task.

REPORT GENERATION FOR A DIGITAL TASK

FIELD

The embodiments discussed herein relate to generating reports for digital tasks.

BACKGROUND

The advent of the computer age has led users to perform digital tasks (e.g., downloading, installing, and/or updating a computer program, generating content such as making a movie, generating an online survey, generating a report, backing-up data, etc.), which may include user interaction (e.g., one or more user actions) with one or more application programs.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving an identification of a digital task initiated by a user. The method may also include electronically monitoring, via at least one processor, at least one of user interaction with at least one application while the user performs the digital task via an electronic system and a state of the electronic system while the user performs the digital task via the electronic system. Further, the method may include capturing, via the at least one processor, a plurality of snapshots for the digital task. In some embodiments, each snapshot of the plurality of snapshots may include information for at least of one or more user actions and the state of the electronic system while the user performs the digital task. The method may also include generating, via the at least one processor, a report for the digital task including the plurality of snapshots. Moreover, the method may include filtering the report to identify and remove one or more unnecessary snapshots of the report to generate an updated report for the digital task.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
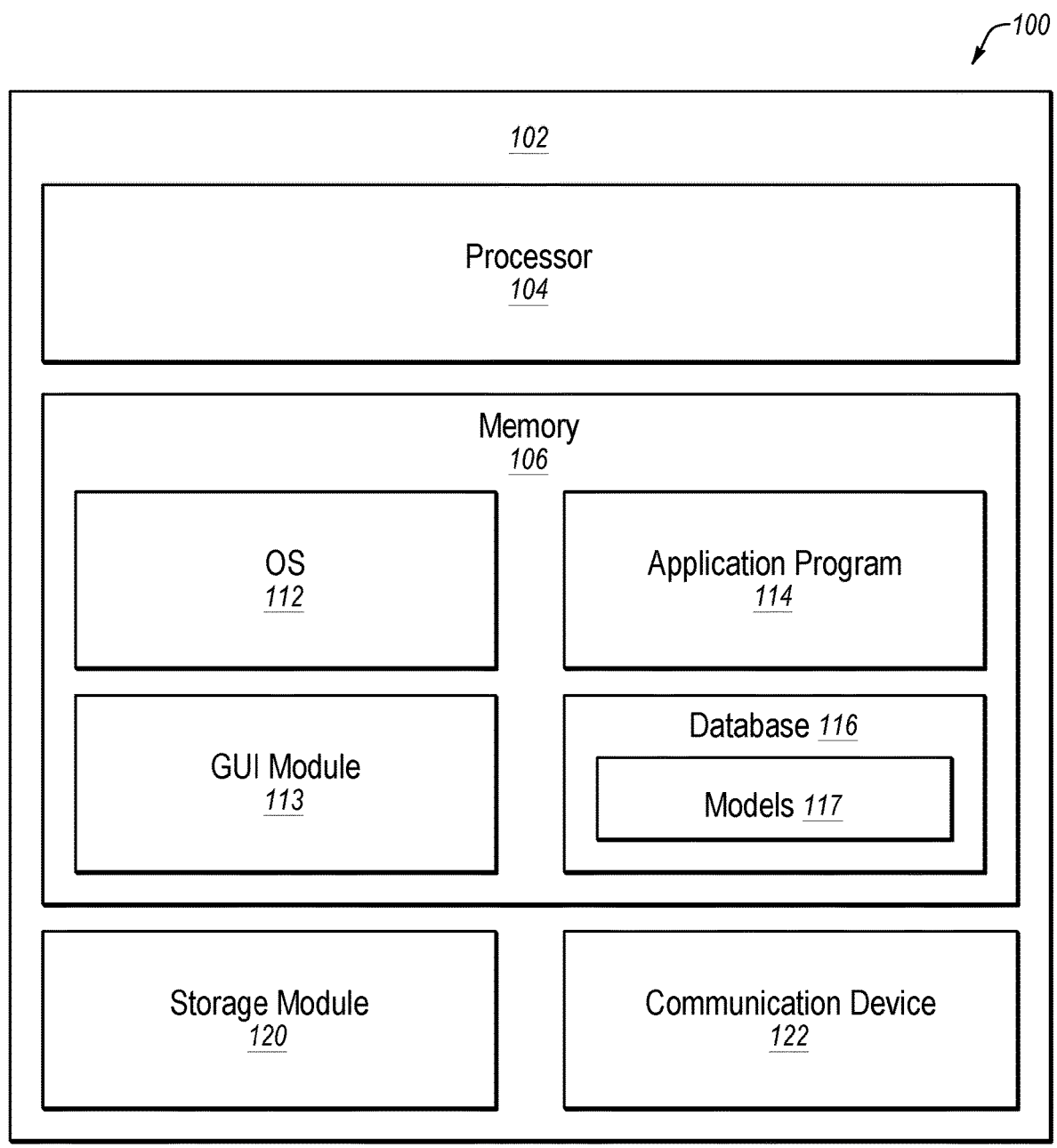
FIG. 1 is a block diagram of an example digital report generation system.

Some embodiments discussed herein relate to generating a report (e.g., an electronic report) including one or more snapshots, which may include one or more actions (e.g., steps and/or activities) a user took to accomplish a multi-step digital task, information related to system states while the user performed the digital task, and other information related to digital task. More specifically, for example, various embodiments may include frameworks and/or algorithms for generating (e.g., automatically generating) a report identifying actions a user took to accomplish a multi-step digital task, which may include user interaction across multiple applications. In some embodiments, a report may include a plurality of actions to accomplish the digital task. Further, the report may exclude errors or unnecessary actions the user performed while performing the digital task.

Further, according to some embodiments, a system may be configured to provide guidance (e.g., automated guidance) to a user to aid the user with a digital task. The guidance may be based on known machine learning techniques (e.g., known machine learning algorithms and/or known machine learning models) applied to other users' successful execution of the same or similar digital task. As a non-limiting example, collaborative filtering based on, for example, collective matrix factorization (CMF) and/or related learning techniques may be used for providing guidance to a user.

Digital tasks may be extensive and/or complex, may require numerous user actions (also referred to herein as "user acts"), and may require a specific order of user actions. Further, provided instructions (e.g., default instructions) for the digital task may be confusing, incomplete, and/or misleading. In addition, after a user has successfully completed a digital task, which may have included unnecessary and/or erroneous actions performed by the user, it may be difficult for the user to, for example, remember the actions (e.g., in proper order), remember which files (e.g., applications) are required, and/or remember the location of any required files.

For example, a user may install an application (e.g., LimeSurvey), and via trial and error, determine how to successfully complete a digital task (e.g., how to create a branching web survey). Further, an acquaintance (e.g., a colleague) may ask the user to show him or her how to complete the digital task (e.g., create a branching survey in LimeSurvey). For example, the acquaintance may ask the user one or more of the following types of questions: how did you do X?; what was the step after step Y and before step Z?; did step Z work?; where are the components for the digital task located (e.g., files, apps, etc.)?; what components are required to run a particular digital task?.

The user may not remember, or remember incorrectly, and provide the acquaintance with incorrect and/or incomplete advice in response to one or more questions from the acquaintance. Further, the user may waste time (e.g., via launching the application and trying to recreate the digital task).

Various embodiments may provide one or more technical solutions to the problems described above, For example, various embodiments may include a report generation system (e.g., an application and/or a tool) configured to monitor a user's digital activities (e.g., with one or more applications) and generate a report (e.g., a summary/tutorial) identifying one or more useful actions the user took to complete a digital task. In some embodiments, the report may exclude errors and/or unnecessary actions the user performed while attempting to complete the digital task. More specifically, unlike conventional tools, a system, in accordance with one or more embodiments, may compress a user's digital activities and generate a report that may not include unnecessary and/or erroneous user actions. Thus, some embodiments disclosed herein may provide technology-based solutions to effectively and efficiently filter electronic content, and therefore the report (e.g., digital report) and/or performance of a system (e.g., report generation system 100 of FIG. 1) may be improved.

In some embodiments, the system may be configured to provide guidance (e.g., automated guidance) (e.g., via machine learning techniques, such as collaborative filtering based on, for example, CMF) to a user to assist the user to progress on a digital task. More specifically, information (e.g., suggestions, advice, etc.), which may be provided to the user while the user is performing the digital, may be based on machine learning models and/or algorithms and other users' successful execution of the same or similar digital task. As a more specific example, one or more models for a digital task (e.g., backing up data on a Windows OS) may exist (e.g., models 117 of FIG. 1), wherein the one more models may be generated and/or updated based other users' successful completion of the task (e.g., via known machine learning techniques). Thus, if the user is attempting to perform the task (e.g., backing up data on a Windows OS), the user may receive guidance (e.g., suggestions, feedback, hints, tips, etc.) to assist the user to progress on a digital task, wherein the guidance is based on the one or models for the task.

Thus, various embodiments disclosed herein are rooted in computer technology in order to overcome the problems and/or challenges described above. Further, various embodiments provide a specific technical solution to a technical problem. More specifically, for example, various embodiments provide a technology-based solution to generate a report including one or more steps required to complete a digital task (also referred to herein as an "electronic task"). The solution may include, for example, monitoring a user's digital interactions (e.g., including necessary and unnecessary actions), compressing a report to include only necessary actions, and/or enabling a user to review and provide feedback (e.g., annotations, edits, etc.) of a generated report. Further, in various embodiments, the system may be configured to utilize machine learning to assist users in accomplishing a digital task. Accordingly, at least some embodiments disclosed herein may improve computer-related technology by allowing computer performance of a function not previously performable by a computer.

Embodiments of the present disclosure will be explained with reference to the accompanying drawings.

FIG. 1 is a block diagram of an example digital report generation system 100, arranged in accordance with one or more embodiments of the present disclosure. Digital report generation system 100 may include a computing system 102, which may include a processor 104, memory 106, a storage module 120, and a communication device 122. Computing system 102 may include a desktop computer, a laptop computer, a server computer, a tablet computer, a mobile phone, a smartphone, a personal digital assistant (PDA), an e-reader device, a network switch, a network router, a network hub, other networking devices, or other suitable computing system.

Processor 104, storage module 120, memory 106, and/or communication device 122 may all be communicatively coupled such that each of the components may communicate with the other components. System 100 may perform any of the operations described in the present disclosure.

In general, processor 104 may include any suitable special-purpose or general-purpose computer, computing entity, or processing device including various computer hardware or software modules and may be configured to execute instructions stored on any applicable computer-readable storage media. For example, processor 104 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, processor 104 may include any number of processors configured to perform, individually or collectively, any number of operations described in the present disclosure.

In some embodiments, processor 104 may interpret and/or execute program instructions and/or process data stored in storage module 120, memory 106, or both. In some embodiments, processor 104 may fetch program instructions from storage module 120 and load the program instructions in memory 106. After the program instructions are loaded into memory 106, processor 104 may execute the program instructions.

For example, in some embodiments one or more of the processing operations of a device and/or system (e.g., an application program, a server, etc.) may be included in storage module 120 as program instructions. Processor 104 may fetch the program instructions of one or more of the processing operations and may load the program instructions of the processing operations in memory 106. After the program instructions of the processing operations are loaded into memory 106, processor 104 may execute the program instructions such that system 100 may implement the operations associated with the processing operations as directed by the program instructions.

Storage module 120 and/or memory 106 may include computer-readable storage media for carrying or having computer-executable instructions or data structures stored thereon. Such computer-readable storage media may include any available media that may be accessed by a general-purpose or special-purpose computer, such as processor 104. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 104 to perform a certain operation or group of operations.

In some embodiments, storage module 120 and/or memory 104 may store data associated with a digital report generation system. For example, storage module 120 and/or memory 106 may store snapshots, digital reports, digital task identifiers (e.g., digital task names), machine learning models, machine learning algorithms, or any other data related to and/or used by a digital report generation system.

Communication device 122 may include any device, system, component, or collection of components configured to allow or facilitate communication between system 102 and another electronic device. For example, communication device 122 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 122 may permit data to be exchanged with any network such as a cellular network, a Wi-Fi network, a MAN, an optical network, etc., to name a few examples, and/or any other devices described in the present disclosure, including remote devices.

As used herein, the terms "module" or "component" may refer to specific hardware implementations configured to perform the operations of the module or component and/or software objects or software routines that may be stored on and/or executed by, for example, digital report generation system 100. In some embodiments, the different components and modules described herein may be implemented as objects or processes that execute on a computing system (e.g., as separate threads). While some of the system and methods described herein are generally described as being implemented in software (stored on and/or executed by system 100), specific hardware implementations or a combination of software and specific hardware implementations are also possible and contemplated. In this description, a "computing entity" may include any computing system as defined herein, or any module or combination of modules running on a system, such as system 100.

Generally, computing system 102 may operate under control of an operating system 112 stored in memory 106, and interface with one or more users to accept inputs and commands and to present outputs through GUI module 113. In at least some embodiments, computing system 102 may be operably coupled to one or more displays (not shown in FIG. 1) configured to display data to a user via a GUI of GUI module 113.

Although GUI module 113 is depicted as a separate module, the instructions performing the GUI functions may be resident or distributed in operating system (OS) 112, an application program 114, or implemented with special purpose memory and processors. Computer system 102 may also implement a compiler (not shown in FIG. 1) that allows application program 114 written in a programming language to be translated into processor 104 readable code. After completion, application program 114 may access and manipulate data stored in memory 106 of computing system 102 using the relationships and logic that are generated using the compiler.

Further, operating system 112 and application program 114 may include instructions that, when read and executed by computing system 102, may cause computing system 102 to perform the steps necessary to implement and/or use embodiments of the present disclosure. Application program 114 and/or operating instructions may also be tangibly embodied in memory 106 and/or data communications devices, thereby making a computer program product or article of manufacture according to one or more embodiments of the disclosure. As such, the term "application program" as used herein is intended to encompass a computer program accessible from any computer readable device or media. Application program 114, which may include one or more application programs may exist on client (user) device (e.g., a personal computer, mobile device, etc.). Furthermore, portions of application program 114 may be distributed such that some or all of application program 114 may be included on another device, such as a server, which may be remote from a client device. Further, in some embodiments, system 100 includes a database 116, which may include one or more models 117 (e.g., machine learning models) and/or one or more machine learning algorithms (e.g., collaborative filtering based on, for example, CMF) associated with system 100.

Modifications, additions, or omissions may be made to FIG. 1 without departing from the scope of the present disclosure. For example, digital report generation system 100 may include more or fewer elements than those illustrated and described in the present disclosure. For example, digital report generation system 100 may include an integrated display device such as a screen of a tablet or mobile phone or may include an external monitor, a projector, a television, or other suitable display device that may be separate from and communicatively coupled to computing system 100. Further, in addition to system 102, digital report generation system 100 may include other systems or devices (e.g., remote systems and/or remote devices).

According to various embodiments, system 100 may be configured to monitor user interactions (e.g., a sequence of user acts (e.g., steps)) and/or system states while the user performs a digital task and determine which user actions are required for successful completion of the digital task. Further, system 100 may be configured to generate a report (e.g., tutorial) for the digital task. The report, which may include a digital report, may identify the steps in proper order that lead to a successful completion of the digital task.

According to some embodiments, a report may include one or more snapshots that may include information, which may helpful to the user and/or other users to complete the digital task. In some embodiments, the snapshots and/or additional information may be specifically associated with one or more of the user actions and/or system state information.

For example, the information included in a snapshot may include user interaction information, such as user inputs (e.g., text inputs, clicks, voice inputs, etc.). Further, the information may include screenshots (e.g., of an application, a user interface, file contents, etc.), outputs such as images, videos, and/or voice that resulted from user triggered action or computation, files that were created, modified, and/or deleted as a result of user interaction, and/or communication events generated (e.g., emails, posts on chat platforms, or on on-line forums, etc.). The information may also include annotations (e.g., user annotations, such as text notes, audio/ video, etc., the user added to steps in the report) and timing information (e.g., information on how long each step took to execute) (e.g., installation of an application, computation time, etc. so that a user replicating the digital task may know what is normal behavior versus when there is a problem). In some embodiments, system state information may include any information related to system performing the digital task (e.g., version of the operating system, machine capabilities (e.g., memory & CPU configuration), inputs, outputs, screenshots, etc.).

The information may further include documentation, such as information about software used (e.g., applications, operating systems, tools, etc.). The documentation may also include information concerning user interactions aimed at inspecting and/or validating the results of one or more actions (e.g., was a table added to a database, when was a file last modified, etc.). The information may further identify and/or include one or documents and/or webpages that the user accessed and/or consulted when performing the digital task, and/or summaries of one or more options (e.g., automatically extracted summaries) presented to the user (e.g., which version of a plurality of version options did the user select).

During a contemplated operation of system 100, a user may indicate a digital task to be tracked. For example, the user may indicate a beginning of a digital task via selecting one or more buttons of a GUI. Further, the user may provide a name of the digital task to system 100. In some embodiments the user may specify search terms to associate with a digital task report that may be used to match searches done by the user or other users when trying to find the specific report associated with this task at a later time. In the absence of search terms and keywords, system 100 (e.g., one or more search tools) may determine (e.g., automatically) whether a document is relevant by analyzing the content of the document.

Furthermore, the user may pause or resume tracking of the digital task at any time. For example, if, while performing the digital task, the user switches to another activity and/or digital task (e.g., performing an Internet search, reading an email, accessing and/or using an unrelated application, etc.), the user may pause the tracking (e.g., via a GUI). Further, if the user wishes to resume the digital task, the user may resume the tracking (e.g., via the GUI). Moreover, the user may indicate (e.g., via the GUI) an end to the digital task, and whether or not the digital task was completed successfully.

In addition, the user may add (e.g., via the GUI), information (e.g., an audio recording, textual, visual data, and or a graphical annotation) to be associated with the digital task. More specifically, for example, the user may specify whether or not they are satisfied with the current execution of the digital task and/or provide information (e.g., supplement a report) regarding one or more captured snapshots, one or more user actions, system states, etc.

Further, the user may (e.g., in response to an inquiry from system 100) confirm whether or not a user action is related to the digital task. For example, system 100 may provide a question to the user asking whether the user's current use of an application (e.g., Skype) is part of the digital task being tracked. Moreover, system 100 may enable a user to review and/or edit a report of the digital task. Further, system 100 may be configured such that the user may search for a digital report of a digital task.

According to some embodiments, system 100 may be configured to generate a report based on a plurality of phases (e.g., a monitoring phase, a compression phase, and/or a review phase). In some embodiments, system 100 may be configured to monitor a digital task (e.g., during a monitoring phase). For example, system 100 may keep track of which one or more applications (e.g., a website, terminal window, etc.) are associated with the digital task. In some embodiments, to differentiate between user interactions that are part of a monitored digital task and ones that are not, each time a user interacts with a new application during the monitoring of the digital task, system 100 may ask the user to confirm whether or not a new application is associated with the digital task. System 100 may also ask the user to confirm whether or not referenced data (e.g., specific websites, online documentation, etc.) are part of the digital task. In some embodiments, a user may register multiple devices (e.g., laptops, phones, wearables) when a digital task involves multiple devices. System 100 may also be configured to determine whether an application is associated with a digital task based on information from one or more other users' activities (e.g., collaborative filtering).

In some embodiments, system 100 may be configured to record one or more snapshots of one or more user interactions (e.g., each user interaction) and/or associated system state changes. System state changes may include any changes to an electronic system (e.g., changes to one or more applications, operating systems, file systems, etc.). For example, a snapshot may include user interaction information, along with relevant system state changes, screenshots, and/or documentation that the user has accessed. More specifically, for example, upon detecting a change in system state and determining that the change is related to user interaction, system 100 may recursively explore related commands and the changes in system variables or files resulting from the commands, as well as remote information (e.g., data is entered and saved in a website form). For example, if the user entered an input (e.g., text) into an input field and clicked on a "save" button, a new version of a file may be saved, and the user interaction may be associated with the creation of new version of the file.

System 100 may further be configured to capture user interactions with one or more applications that are associated with the monitored digital task. For example, system 100 may capture a keyboard interaction (e.g., followed by pressing "enter" or a "click" (e.g., submitting a web form, sending an email)), a keyboard shortcut (e.g., ctrl+key, function keys), and/or audio/video input/recording (e.g., based on start/stop buttons, menu commands, and/or keyboard combination.)

System 100 may also be configured to capture user interaction backtracking. More specifically, for example, system 100 may detect if and when a user de-selects an option previously selected (e.g., a box on a website or in a pop up window) and/or updates or deletes a file, and/or an input (e.g., text input) previously added and/or created. Further, system 100 may detect if and when a user cancels an operation (e.g., file download and/or installation) in progress, executes a "control-C" in a terminal window where a digital task is in progress, re-loads a page, overwrites a file, etc.

System 100 may also be configured to monitor buttons and commands (e.g., buttons and/or commands including, for example, edit, save, cancel, add, remove, delete, +, −, and other icons that refer to such commands). Further, based on knowledge of an operating system and application commands, some actions and/or commands are known reversals of other actions and/or commands (e.g., "touch" creates a file while "rm" removes a file).

Further, system 100 may be configured to detect semantic repetition. For example, system 100 may detect that the user is trying to accomplish the same subtask performed earlier but in a different way (e.g., meaning that the initial action was not successful), such as downloading the same application from a different website, or downloading a different version of the application. Moreover, system 100 may be configured to detect abandoned steps (e.g., detect files/apps the user does not use). For example, if a file and/or an application has not been accessed after downloading, system 100 may determine that the file and/or application is unnecessary and/or the act of downloading the file and/or application was unnecessary.

According to some embodiments, system 100 may be configured to determine relevant effects of an interaction based on semantic analysis of the interaction, which application the user input targeted, and/or which application caused a change and/or and output (e.g., an operating system (OS) state change, a file system (FS) state change, and/or an output (e.g., visual and/or audio output)). For example, relevant OS state (e.g., environment variables, processes, etc.) changes due to the user interaction may include starting a new process (e.g., application) or stopping an existing process (e.g., application). More specifically, for example, semantic analysis of keyboard interactions and clicks may be used to determine if a change in an environment variable or other OS configuration is related to an input from the user (e.g., if user typed "setenv PATH=/usr/bin," it may be determined that the change in the PATH variable was caused by the user's input).

Further, with regard to FS state changes due to user interaction, semantic analysis of keyboard interactions and "clicks" may be used to determine if changes were caused by user input (e.g., a "rm filename" command in a terminal window may indicate the user removed a file). In some embodiments, the FS may be remote (e.g., in the cloud), in which case a copy of one or more characteristics and/or properties of the remote FS may be used to recreate the FS state for generating the digital task report. For example, a command by a user on a remote FS to create a file may be used to anticipate that the file was in fact created on the remote FS. In at least these embodiments, user input (e.g., via keyboard, clicks, file uploads, etc.) to the remote FS may be tracked and a snapshot of a related (e.g., recreated) FS may be recorded.

An output of an application may include a video, audio, image, and/or other document (e.g., provided on a screen). Further, a user action may cause a communication to occur. For example, a user action may cause a text and/or an email to be sent and/or an online post to occur.

In some embodiments, system 100 may be configured to monitor documentation that a user accesses and/or consults (e.g., webpages, downloaded files, etc.). Further, for example, eye tracking technology may be used to determine one or more parts of a document that the user is viewing (e.g., to determine portions of the document to highlight). Further, in some embodiments, system 100 may monitor inspection and/or validation tasks performed by the user. The inspection and/or validation tasks may or may not cause system state changes, however, the inspection and/or validation tasks may help the user verify results of their actions. For example, a user may inspect a file, watch a video created by a process or child process resulting from a user interaction. Moreover, collaborative filtering can be used to refine the monitoring. In some embodiments, user interaction and its effects (e.g., system state changes) may not be co-timed due to delays in execution of certain tasks. Thus, system 100 may employ semantic analysis.

Figure 2:
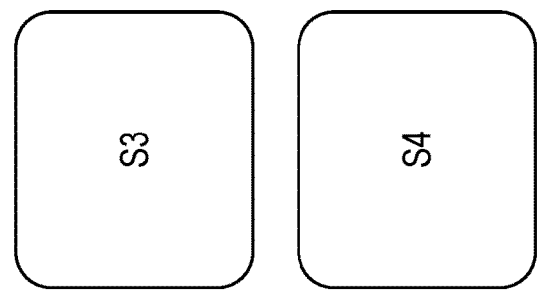
FIG. 2 depicts example system snapshots prior to and after a compression phase.
Figure 2:
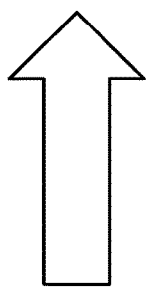
Figure 2:
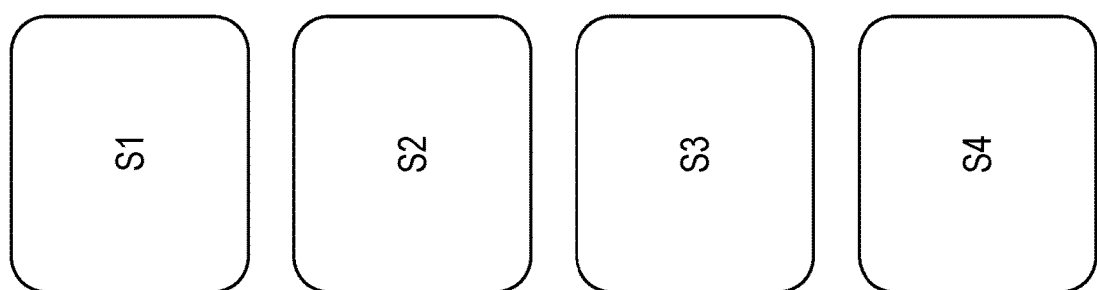

System 100 may be configured to perform compression (e.g., of a during a compression phase). For example, one or more snapshots for a digital task that do not impact the execution of the digital task may be removed. For example, FIG. 2 depicts a plurality of captured snapshots S1-S4. In this example, system 100 may determine that snapshots S1 and S2 are unnecessary (e.g., due to the user reversing an action, repeating a step via an alternate method, and/or abandoning useless action) and, thus, snapshots S1 and S2 may be removed. In some embodiments, compression may occur while a user performs a digital task and/or after the user has completed the digital task.

Some embodiments may include user review (e.g., a user review phase). In these embodiments, a sequence of user interactions from the remaining snapshots may be generated and the user may be asked to confirm that the sequence describes a successful completion of the digital task. In some embodiments, the sequence may include, for example, text and/or screenshots. Further, system 100 may enable the user to re-arrange and edit (e.g., add to or remove) the sequence. More specifically, the user may annotate one or more interactions of the sequence, obfuscate sensitive information, and/or save the report.

Figure 3:
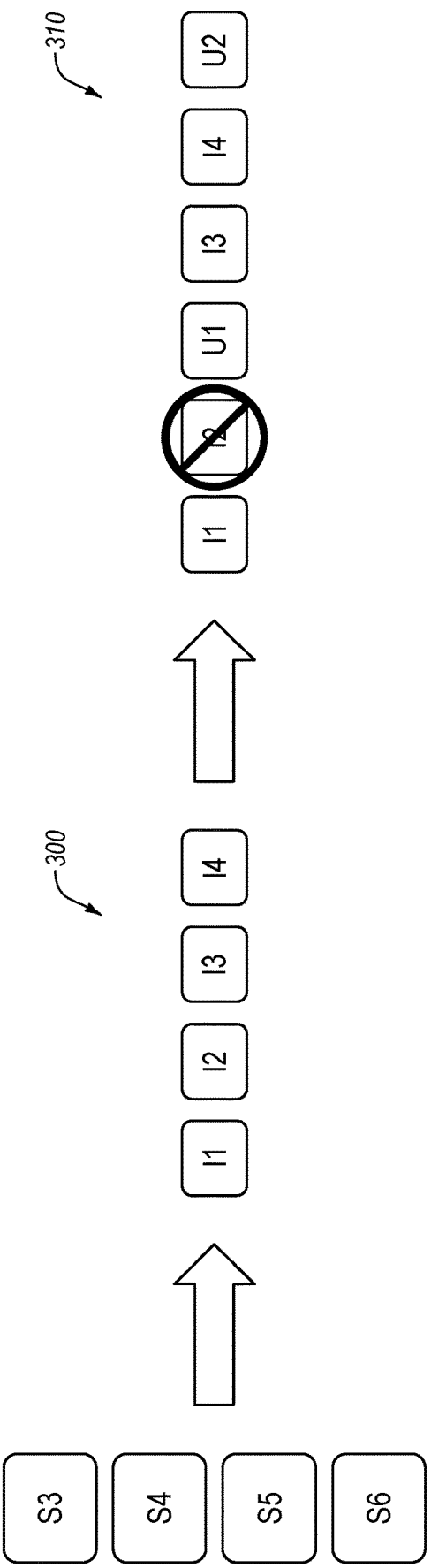
FIG. 3 depicts example system snapshots and example iteration sequences prior to and after a review phase.

For example, FIG. 3 depicts a plurality of snapshots S3-S6, a sequence 300 of user interactions I1-I4 based on snapshots S3-S6, and a sequence 310 of user actions I1, U1, I3, I4 and U2 after the user has reviewed and edited the report. In this example, a "U" action may designate an action added by the user during the review phase. In this example, in response to the user review, user actions U1 and U2 were added by the user and user action I1 was removed by the user.

According to various embodiments, system 100 may utilize collaborative filtering to provide assistance to a user and/or generate a digital report. For example, based on capturing and learning different successful sequences of executing a digital task across a pool of users, when a user is unsuccessfully trying to execute a similar digital task, system 100 may, rather than simply provide the user with fixed tutorial (e.g., where the use may might have to start from scratch), provide one or more suggestions to the user (e.g., suggest next steps that are consistent with the user's approach, current status and direction) for completion of the digital task.

Further, in some embodiments, a user's (e.g., past or current user) interaction with, for example, a developer discussion forum (e.g., Stack overflow), or some other forum (e.g., a forum internal to an enterprise), may be utilized to provide assistance and generate a digital report. More specifically, for example, suggestions and/or answers may be posted in a forum. As one example, when an identifiable subtask (e.g., creating a branching question using LimeSurvey) is successful, content (e.g., an answer, an example, suggestion, etc.) may be automatically posted on a stack overflow. In some embodiments, a post may be scrubbed of any sensitive information prior to posting. Further, system 100 may be configured to search on-line forums (e.g., stack overflow) if needed (e.g., if system 100 lacks an immediate suggestion). Further, when a user action is successful, system 100 may provide and/or enable a user to provide an "up vote" on stack overflow (e.g., an auto up vote). When a user action is not successful, system 100 may provide and/or enable a user to provide a "down vote" on stack overflow (e.g., an auto down vote).

System 100 may be configured to (e.g., over time), fine tune the detection process for capturing relevant snapshots including user interaction and/or system state changes. Further, system 100 may be configured to auto generate snapshots, and changes in a state that resulted from a particular user interaction may be automatically registered by system 100.

Figure 4:
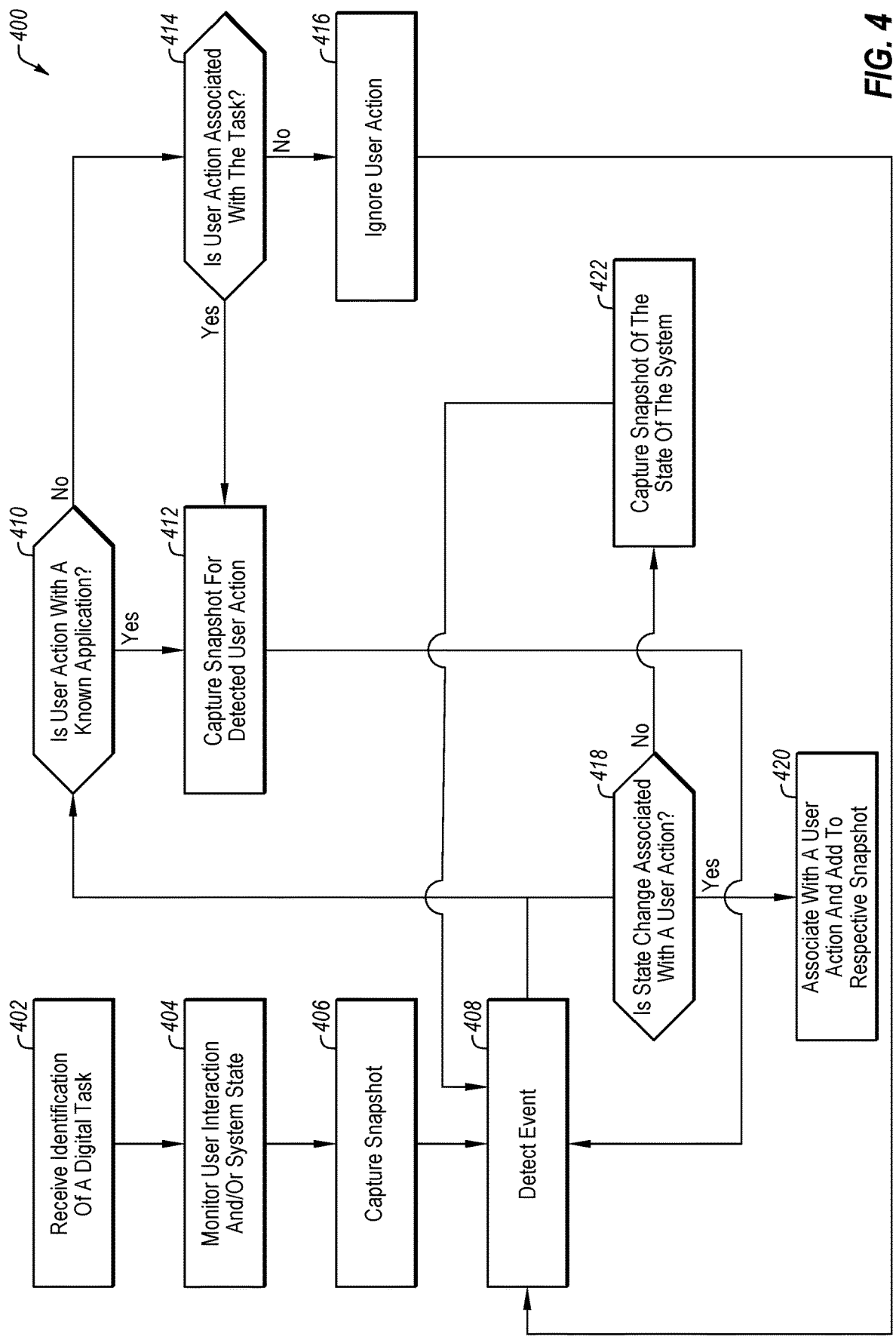
FIG. 4 shows an example flow diagram of a method of capturing snapshots for a digital task.

FIG. 4 shows an example flow diagram of a method 400 of capturing snapshots for a digital task, arranged in accordance with at least one embodiment described herein. According to some embodiments, a digital report of the digital task may be generated based on one or more captured snapshots. Although illustrated as discrete blocks, various blocks may be divided into additional blocks, combined into fewer blocks, or eliminated, depending on the desired implementation.

In some embodiments, method 400 may be performed by one or more devices and/or one or more systems, such system 100 of FIG. 1. For instance, processor 104 (see FIG. 1) may be configured to execute computer instructions stored on memory 106 to perform functions and operations as represented by one or more of the blocks of method 400.

Method 400 may begin at block 402. At block 402, an identification of a digital task may be received, and method 400 may proceed to block 404. For example, the identification may include a name of the digital task provided by a user (e.g., via a GUI of an application program (e.g., application program 114 of FIG. 1)) may be received at system 100 (see FIG. 1). Further, in some embodiments, the identification may identify one or more applications that may be used by the user to complete the digital task.

At block 404, a monitoring operation may be initiated, and method 400 may subsequently proceed to block 406. For example, processor 104 (see FIG. 1) may electronically monitor user interaction with an electronic system while the user performs the digital task on the electronic system and/or monitor a state of the electronic system while the user performs the digital task on the electronic system. For example, monitoring user interaction may include tracking user actions (e.g., websites and/or other documentation accessed by the user, applications accessed and/or used by the user, user inputs (e.g., text, mouse clicks, keyboard inputs, voice, etc.), etc.). Interactions I1-I4 (see FIG. 3) are example user actions that were tracked (e.g., via system 100 of FIG. 1). Further, the state of the electronic system may be monitored continuously, periodically, upon detection of user interaction, as designated by the user, or any other suitable monitoring option.

At block 406, a snapshot may be captured, and method 400 may proceed to block 408. For example, an initial snapshot of a file system, operating system, and/or a screenshot of a display may be captured via processor 104 (see FIG. 1).

At block 408, an event may be detected. For example, an event may include user interaction (e.g., a user action) and/or a change in the state of the electronic system. In some embodiments, a detected change in the state of the electronic system may be caused by user interaction (e.g., one or more user actions) that occurred proximate in time to the state change or user interaction that occurred prior to the state change (e.g., one or more previous user actions). In this example, it may be determined whether the detected event is a user action, a change in the state of the electronic system, or both. If the event is a user action, method 400 may proceed to block 410. If the event is a change in the state of the electronic system, method 400 may proceed to block 418. For example, an event may be detected via processor 104 (see FIG. 1).

At block 410, a determination may be made as to whether or not the detected user action is associated with a known application. If the user action is associated with the known application, method 400 may proceed to block 412. If the user action is not associated with the known application (e.g., but is associated with a different application), method 400 may proceed to block 414. In some embodiments, processor 104 (see FIG. 1) may determine whether or not the detected user action is associated with the known application.

At block 414, a determination may be made as to whether the detected user action is associated with the digital task. In some embodiments, processor 104 (see FIG. 1) may determine whether or not the detected user action is associated with the digital task. Further, in some embodiments, a system (e.g., system 100) may, in response to an inquiry (e.g., from system 100 to the user), receive information from the user as to whether or not the detected user action is associated with the digital task. If the detected user action is associated with the digital task, method 400 may proceed to block 412. If the detected user action is not associated with the digital task, method 400 may proceed to block 416.

At block 412, a snapshot for the detected user action may be captured, and method 400 may return to block 408. For example, the snapshot, which may include, for example, at least one screenshot of information displayed by the electronic system during performance of the digital task, information for data accessed by the user during performance of the digital task, and/or any other information related to the user action, may be captured via processor 104 (see FIG. 1).

At block 416, the user action may be ignored, and method 400 may return to block 408.

At block 418, a determination may be made as to whether or not the detected state change is associated with a user action. If the detected state change is associated with a user action, method 400 may proceed to block 420. If the detected state change is not associated with a user action, method 400 may proceed to block 422. In some embodiments, processor 104 (see FIG. 1) may determine whether or not the detected state change is associated with a user action.

At block 420, the detected state change may be associated with at least one user action. Further, the detected state change may be associated with (e.g., added to) at least one associated snapshot. For example, processor 104 (see FIG. 1) may associate the state change with at least one user action and/or associate the state change with at least one captured snapshot.

At block 422, a snapshot of the detected state change may be captured. For example, the snapshot may be captured via processor 104 (see FIG. 1). The snapshot captured at block 422 may be used to generate a digital task report, as described more fully below with reference to FIG. 5.

According to various embodiments, method 400 may continue until the digital task has ended (e.g., upon completion of the task and/or termination of the task).

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 5:
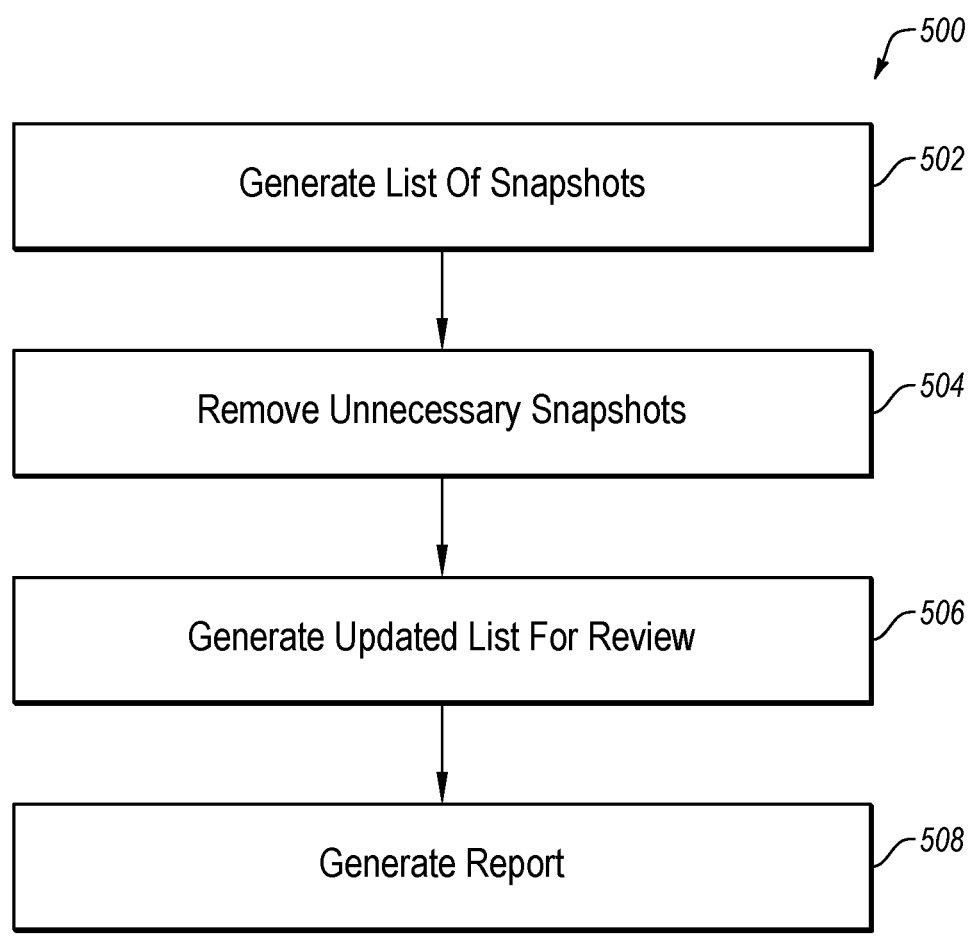

FIG. 5 shows an example flow diagram of a method 500 of generating a digital report, arranged in accordance with at least one embodiment described herein. Although illustrated as discrete blocks, various blocks may be divided into additional blocks, combined into fewer blocks, or eliminated, depending on the desired implementation.

In some embodiments, method 500 may be performed by one or more devices and/or one or more systems, such as system 100 of FIG. 1. For instance, processor 104 (see FIG. 1 may be configured to execute computer instructions stored on memory 106 to perform functions and operations as represented by one or more of the blocks of method 500.

Method 500 may begin at block 502. At block 502, a list of snapshots may be generated, and method 500 may proceed to block 504. In some embodiments, the list may include a digital report. For example, a plurality of captured snapshots, each of which including information of one or more user actions with an electronic system and/or a state of the electronic system while a user performed a digital task, may be generated via system 100 (e.g., processor 104) of FIG. 1. Further, snapshots in the list of snapshots may be captured in accordance with one or more embodiments disclosed herein.

At block 504, one or more snapshots for unnecessary and/or erroneous user actions may be removed from the list of snapshots, and method 500 may proceed to block 506. For example, processor 104 (see FIG. 1) may filter the list of snapshots to identify and remove one or more unnecessary snapshots of the list to generate an updated list (e.g., an updated digital report).

At block 506, the updated list, which may include a report (e.g., digital report), may be generated for review, and method 500 may proceed to block 508. For example, the updated list may be generated via processor 104 (see FIG. 1) and provided to a user for review. Moreover, in response to feedback from the user review (e.g., after user review), the list (e.g., the digital report) may be updated (e.g., annotated, re-ordered, supplemented, etc.).

At block 508, a report may be generated. For example, processor 104 (see FIG. 1) may generate a digital report including one or more snapshots, which may include, for example, information related to successful completion of a digital task. For example, the information may be related to user interactions, system states, system outputs, user annotations, timing, and/or any relevant documentation (e.g., OS versions, applications and/or tools utilized, data accessed by the user).

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As noted above, a user may perform a digital task (e.g., download and install an application (e.g., a survey tool, such as LimeSurvey), create a survey (e.g., branching web survey)), and snapshots captured for the digital task may be used to generate a report for the digital task. With reference to FIGS. 1, 4, 5, and 6A-6C an example contemplated operation of system 100 for generating a report of a digital task will now be described.

For example, a user, after initiation of an application (e.g., application program 114 of system 100), may enter an identification (e.g., a name) of a digital task via a GUI. The identification of the digital task may be received (e.g., by system 100), and user interaction and/or a system state may be monitored by system 100 (e.g., see block 402 and 404 of FIG. 4). Further, in some embodiments, system 100 may capture an initial snapshot (e.g., snapshot SS0) (e.g., see block 406 of FIG. 4) including, for example, information related to the FS, an operating system, and/or a screenshot of a display provided to the user.

Further, in this example, the user, who may be using, for example a Mac OS, may download an application (e.g., LimeSurvey from a website (e.g., limesurvey.com)). In response to the download, system 100 may detect an event (e.g., user interaction and system state change) (e.g., see block 408 of FIG. 4), determine the download is associated with a known application (e.g., see block 410 of FIG. 4), and a snapshot (e.g., a snapshot SS1) of the user action (e.g., including information related to the download) may be captured (see e.g., block 412 of FIG. 4). Further, system 100 may determine that a detected system state change is associated with the download and, thus, system 100 may associate the state change with the user action and the respective snapshot SS1 (e.g., see blocks 418 and 420 of FIG. 4).

Further, after noticing the lack of an installer (e.g., via accessing the downloaded files), the user may return to the website (e.g., limesurvey.com) and determine that the only non-hosted solution is for Windows operating systems. System 100 may detect this event (e.g., accessing the website) as a user action, determine the user action is associated with the application (e.g., the LimeSurvey application), and the user action may be captured as another snapshot (e.g., snapshot SS2).

After performing a web search (e.g., detected user action and captured as a snapshot SS3) for, for example, "LimeSurvey for Mac OS," the user may identify one or more links in one or more online posts (e.g., on stackoverflow.com). Further, the user may identify an application package "Bitnami," which includes LimeSurvey for Mac OS. The user may download and install LimeSurvey via Bitnami. System 100 may detect this download event as a user action, determine the user action is associated with the application (e.g., the LimeSurvey application), and the user action (e.g., including information related to the download) may be captured as another snapshot (e.g., snapshot SS4). Further, system 100 may determine that a detected system state change is associated with the download and, thus, system 100 may associate the state change with the respective user action and the respective snapshot SS4 (e.g., see blocks 418 and 420 of FIG. 4). In this example, one or more of prior actions performed by the user (e.g., actions captured by snapshots SS1, SS2, and SS3) may be considered an unnecessary and/or an erroneous step. In some embodiments, system 100 may be able to determine whether one or more prior actions are unnecessary and/or erroneous based on future actions (or lack thereof) by the user. More specifically, if the application downloaded from limesurvey.com is never accessed and/or installed by the user, system 100 may determine that the step of downloading the application was unnecessary and/or erroneous. In other embodiments, system 100 may ask the user whether a user action was necessary and/or whether the user action was an erroneous action.

Continuing with this example, the user may launch the application (e.g., LimeSurvey). System 100 may detect this event (e.g., the application launch) as a user action, determine the user action is associated with the application (e.g., the LimeSurvey application), and the user action may be captured as another snapshot (e.g., snapshot SS5). Further, as illustrated in a screenshot 600 of FIG. 6A, Bitnami may provide the user with an option (e.g., via a checkbox) to "Launch limesurvey in the cloud with Bitnami." In this example, the user may wish to leave the checkbox unchecked (as indicated by reference numeral 602), and screenshot 600 may be part of an associated snapshot (e.g., snapshot SS5).

Further, for example, the user's web browser may become unresponsive, and the user may check the network status (e.g., via a network status icon). In this example, system 100 may provide a question to the user asking whether checking the network status is associated with the digital task. In response thereto, the user may indicate that the network status check was not part of the digital task, and thus the user action (e.g., checking the network status) may be ignored (e.g., see blocks 414 and 416 of FIG. 4).

Moreover, after exploring a displayed webpage, the user may be unable to locate a link to create a survey. Thus, in this example, the user may search the Internet for information for creating a survey in Bitnami LimeSurvey. System 100 may detect the Internet search as a user action, determine the user action is associated with the application (e.g., the LimeSurvey application), and the user action may be captured as a snapshot (e.g., snapshot SS6). Further, system 100 may determine that a detected system state change is associated with the Internet search and, thus, system 100 may associate the state change with respective the user action (e.g., the Internet search) and the respective snapshot SS6 (e.g., see blocks 418 and 420 of FIG. 4).

Further, the user may identify (e.g., in a text file) a URL of the admin interface for a LimeSurvey, which the user may enter (e.g., via typing, or coping and pasting) into a browser. System 100 may detect this event (e.g., URL submission) as a user action, determine the user action is associated with the application (e.g., the LimeSurvey application), and the user action may be captured as a snapshot (e.g., snapshot SS7) (e.g., see block 412 of FIG. 4). Further, system 100 may determine that a detected system state change is associated with the user action (e.g., submission of the URL) and thus, system 100 may associate the state change with the respective user action and the respective snapshot SS7 (e.g., see blocks 418 and 420 of FIG. 4). In this example, system 100 may determine that the prior action performed by the user (e.g., user action captured by snapshot SS6) may be considered an unnecessary and/or an erroneous step.

Continuing with this example, the user may create a question for the survey. Further, the user, attempting to determine a location to enter an answer to the question for the survey, may click on various options to no avail. In this example, after a first erroneous attempt by the user to enter the answer, the user successfully enters the answer on a second attempt. In this example, system 100 may detect each of the first and second attempts as a user action, determine the each user action is associated with the application (e.g., the LimeSurvey application), and the user actions may each be captured as a snapshot (e.g., see block 412 of FIG. 4 and associated description) (e.g., snapshot SS8 for the erroneous attempt and snapshot SS9 for the successful attempt). In this example, system 100 may determine that the user action captured by snapshot SS8 may be considered an unnecessary and/or an erroneous step.

Figure 6A:
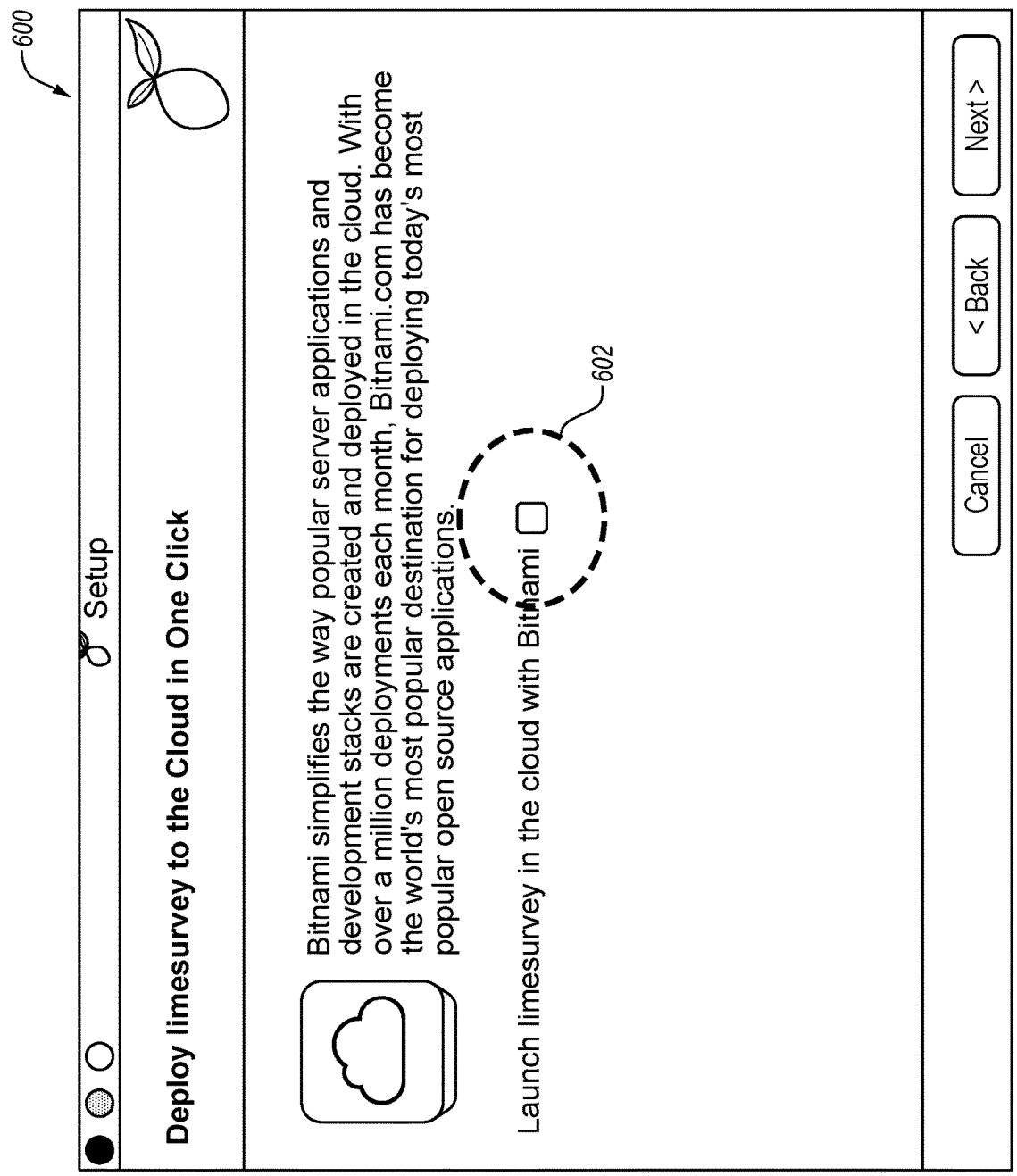
Figure 6B:
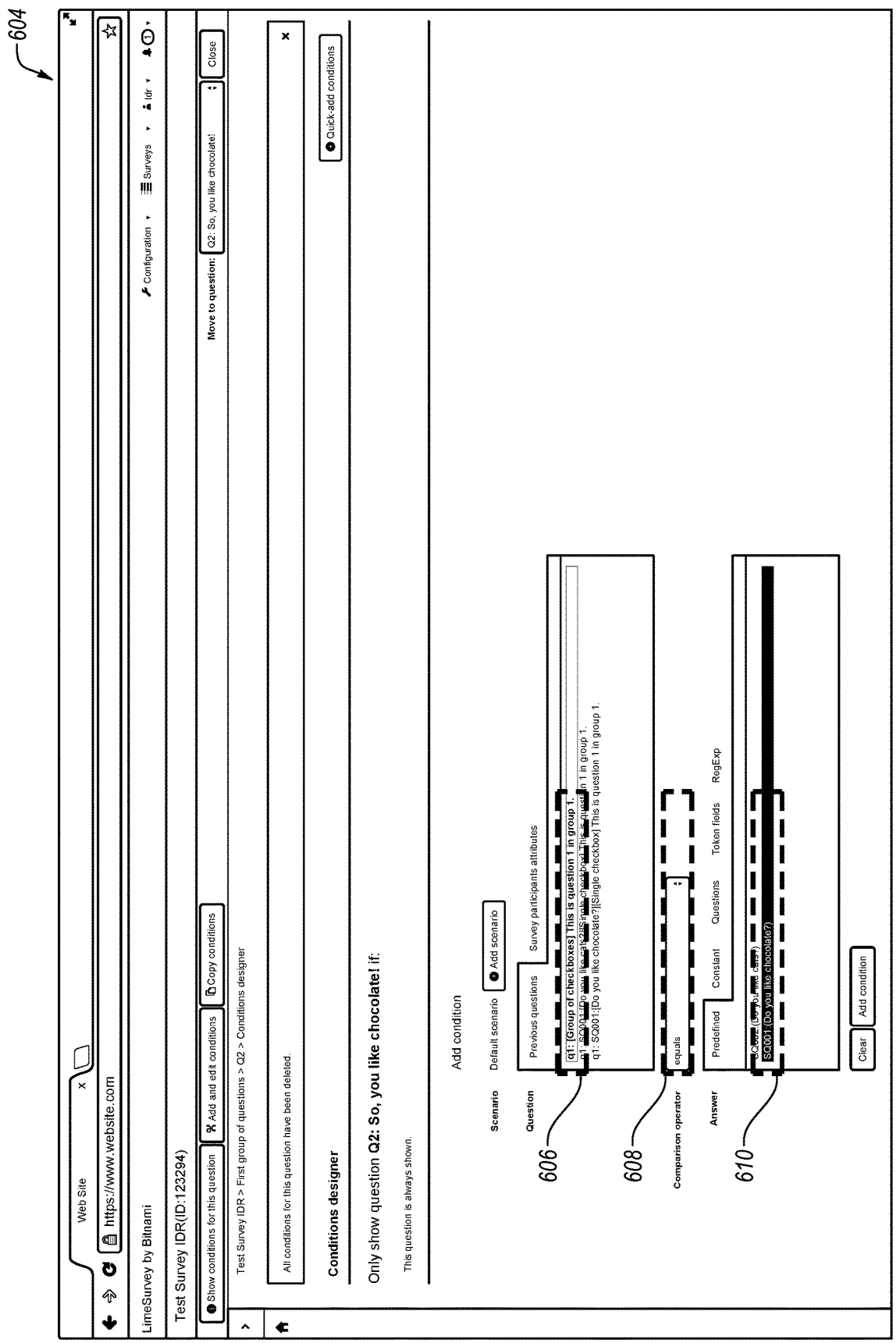

Further, with reference to FIG. 6B, a screenshot 604, which may be part of a snapshot (e.g., snapshot SS9), may illustrate one or more user selections for a "Question" (user selection 606), a "Comparison operator" (user selection 608), and an "Answer" (user selection 610) for the survey. More specifically, as shown in screenshot 604, the notation "SQ001:(Do you like chocolate?)" may indicate that the user has selected the first answer choice (SQ001) to the question "Do you like chocolate?". "SQ001" may be the default notation used by LimeSurvey for the first answer choice to a question, and the number ("001") may be incremented for the rest of the answer choices. In this example, because answer choice 1 (SQ001) is "Yes" and answer choice 2 (SQ002) is "No," if the user selected SQ001, LimeSurvey may display "So, you like chocolate!" once the user has selected "Yes" as an answer.

Figure 6C:
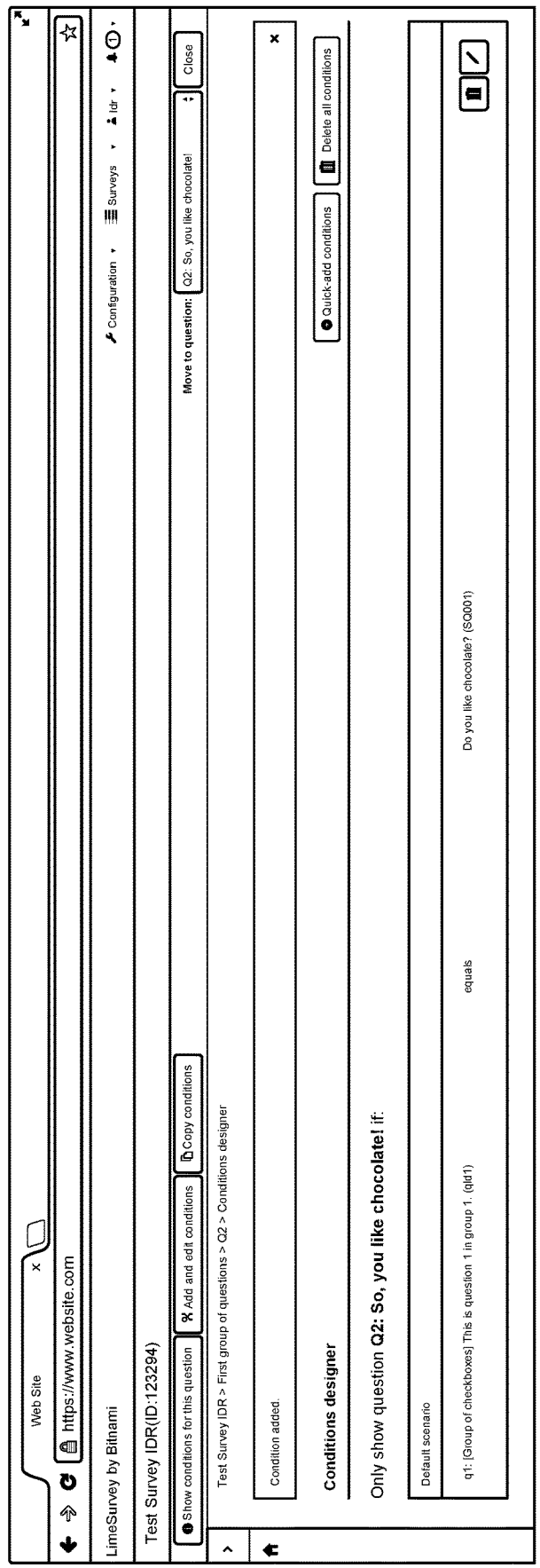

Screenshot 612 illustrated in FIG. 6C may also be part of a snapshot (e.g., snapshot SS9) and may illustrate a state of the survey (e.g., after a user has saved and/or submitted the survey).

Continuing with this example, system 100 may configured to generate a list of snapshots (e.g., snapshots SS0-SS9) for the digital task (see block 502 of FIG. 5). Further, in this example, system 100 may remove unnecessary snapshots (e.g., SS1-SS3, SS5, and SS8) (see block 504 of FIG. 5), which may be have been determined to be related to unnecessary and/or erroneous user actions. Further, system 100 may generate an updated list of snapshots (e.g., including snapshots SS0, SS4, SS5, SS7, and SS9). After review of and/or edits to the list by the user, a report including one or more snapshots may be generated (e.g., see block 508 of FIG. 5). In addition to including snapshots SS0, SS4, SS5, SS7, and SS9, the user may provide additional information, which may be included in, for example, and additional snapshot (e.g., snapshot SS10) or may be added to an any existing snapshot. More specifically, for example, the user may provide annotations to snapshot SS9, and may generate additional data that may be included within an additional snapshot (e.g., snapshot SS10).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of a computing system (e.g., system 100 of FIG. 1). In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   receiving an identification of a digital task initiated by a user;
   electronically monitoring, via at least one processor, at least one of,
   user interaction with at least one application while the user performs the digital task via an electronic system, and
   a state of the electronic system while the user performs the digital task via the electronic system;
   capturing, via the at least one processor, a plurality of snapshots for the digital task, each of the plurality of snapshots including information for at least of one or more user actions and the state of the electronic system while the user performs the digital task;
   while the user performs the digital task, providing user-specific guidance to the user for performing the digital task based on one or more machine learning models for the digital task, the machine learning model configured to assess previous successful performances of the digital task by other users using a plurality of approaches to perform the digital task, the user-specific guidance selected based on a given approach of the plurality of approaches undertaken by the user in performing the digital task;
   generating, via the at least one processor, a report for the digital task including the plurality of snapshots; and
   filtering the report to identify and remove one or more unnecessary snapshots of the report to generate an updated report for the digital task.

2. The method of claim 1, wherein filtering the report to identify and remove one or more unnecessary snapshots comprises filtering the report to identify and remove at least one of one or more unnecessary user actions and one or more erroneous user actions performed by the user while performing the digital task.

3. The method of claim 1, wherein capturing the plurality of snapshots comprises capturing at least one screenshot of information displayed by the electronic system during performance of the digital task, information for data accessed by the user during performance of the digital task, and at least one change in the state of the electronic system during performance of the digital task.

4. The method of claim 1, further comprising determining whether a user action of the one or more user actions was performed as part of the digital task.

5. The method of claim 1, wherein electronically monitoring comprises electronically monitoring user interaction with a plurality of applications utilized by the user to perform the digital task.

6. The method of claim 1, further comprising updating one or more digital task machine learning models based on at least one captured snapshot of the plurality of captured snapshots.

7. The method of claim 1, further comprising revising one of the report and the updated report based on feedback provided from the user.

8. The method of claim 7, wherein revising one of the report and the updated report based on feedback provided from the user comprises adding at least one user annotation to one of the report and the updated report.

9. A non-transitory computer-readable medium having computer instructions stored thereon that are executable by a processing device to perform or control performance of operations comprising:
   receiving an identification of a digital task initiated by a user;
   electronically monitoring at least one of user interaction with at least one application while the user performs the digital task via an electronic system and a state of the electronic system while the user performs the digital task via the electronic system;
   capturing a plurality of snapshots for the digital task, each snapshot of the plurality of snapshots including information for at least of one or more user actions and the state of the electronic system while the user performs the digital task;
   while the user performs the digital task, providing user-specific guidance to the user for performing the digital task based on one or more machine learning models for the digital task, the machine learning model configured to assess previous successful performances of the digital task by other users using a plurality of approaches to perform the digital task, the user-specific guidance selected based on a given approach of the plurality of approaches undertaken by the user in performing the digital task;
   generating a report for the digital task including the plurality of snapshots; and
   filtering the report to identify and remove one or more unnecessary snapshots of the report to generate an updated report.

10. The non-transitory computer-readable medium of claim 9, wherein filtering the report to identify and remove one or more unnecessary snapshots comprises filtering the report to identify and remove at least one of one or more unnecessary user actions and one or more erroneous user actions performed by the user while performing the digital task.

11. The non-transitory computer-readable medium of claim 9, wherein capturing the plurality of snapshots comprises capturing at least one screenshot of information displayed by the electronic system during performance of the digital task, information for data accessed by the user during performance of the digital task, and at least one change in the state of the electronic system during performance of the digital task.

12. The non-transitory computer-readable medium of claim 9, the operations further comprising determining whether a user action of the one or more user actions was performed as part of the digital task.

13. The non-transitory computer-readable medium of claim 9, wherein electronically monitoring comprises electronically monitoring user interaction with a plurality of applications utilized by the user to perform the digital task.

14. The non-transitory computer-readable medium of claim 9, the operations further comprising updating one or more digital task machine learning models based on at least one captured snapshot of the plurality of captured snapshots.

15. The non-transitory computer-readable medium of claim 9, the operations further comprising revising one of the report and the updated report based on feedback provided from the user.

16. The non-transitory computer-readable medium of claim 15, wherein revising one of the report and the updated report based on feedback provided from the user comprises adding at least one user annotation to one of the report and the updated report.

* * * * *